(12) United States Patent
Lee (10) Patent No.: US 8,279,192 B2
(45) Date of Patent: *Oct. 2, 2012

(54) MOBILE COMMUNICATION TERMINAL AND METHOD OF SELECTING MENU AND ITEM

(75) Inventor: Chang Sub Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,312

(22) Filed: Jan. 9, 2012

(65) Prior Publication Data

US 2012/0113036 A1  May 10, 2012

Related U.S. Application Data (63) Continuation of application No. 12/899,482, filed on Oct. 6, 2010, now Pat. No. 8,120,590, which is a continuation of application No. 11/862,906, filed on Sep. 27, 2007, now Pat. No. 7,834,861.

(30) Foreign Application Priority Data

Sep. 27, 2006 (KR) .................. 10-2006-0094159

(51) Int. Cl.
*G06F 3/041* (2006.01)
(52) U.S. Cl. .................. 345/173; 715/841; 715/810
(58) Field of Classification Search .......... 345/173–178, 345/156, 168–169; 455/566; 715/810, 812–814, 715/817–824, 828, 829, 835, 838, 840–845; 178/18.01–18.09, 18.11

See application file for complete search history.

(56) References Cited

U.S. PATENT DOCUMENTS

| | | | |
|---|---|---|---|
| 5,204,947 | A | 4/1993 | Bernstein et al. |
| 6,597,345 | B2 | 7/2003 | Hirshberg |
| 2001/0003097 | A1 | 6/2001 | Jeoung |
| 2003/0064757 | A1 | 4/2003 | Yamadera et al. |
| 2004/0095395 | A1 | 5/2004 | Kurtenbach |
| 2004/0212605 | A1 | 10/2004 | Fitzmaurice et al. |
| 2004/0212617 | A1 | 10/2004 | Fitzmaurice et al. |
| 2004/0261031 | A1 | 12/2004 | Tuomainen et al. |
| 2005/0044509 | A1 | 2/2005 | Hunleth et al. |
| 2005/0066291 | A1 | 3/2005 | Lewak |
| 2005/0076309 | A1 | 4/2005 | Goldsmith |
| 2005/0134578 | A1 | 6/2005 | Chambers et al. |
| 2005/0204301 | A1 | 9/2005 | Keely, Jr. et al. |
| 2006/0020904 | A1 | 1/2006 | Aaltonen et al. |
| 2006/0056613 | A1 | 3/2006 | Kim et al. |
| 2006/0143574 | A1 | 6/2006 | Ito et al. |
| 2007/0046633 | A1 | 3/2007 | Hirshberg |
| 2007/0150834 | A1 | 6/2007 | Muller et al. |

FOREIGN PATENT DOCUMENTS

WO   WO 2007/036762 A1   4/2007

*Primary Examiner* — Stephen Sherman
(74) *Attorney, Agent, or Firm* — Birch, Stewart, Kolasch & Birch, LLP

(57) ABSTRACT

A mobile terminal including a wireless communication unit configured to wirelessly communicate with at least one other terminal, a touch screen display configured to display a plurality of independent first objects and a controller configured to receive a selection signal indicating a touching of one of the first objects, control the touch screen display to distinctly display a second independent object indicating a drop point where the touched first object can be dropped and receive a dragging signal indicating the touched first object is being touched, dragged and dropped toward the second object. The mobile terminal stops displaying other non-selected first objects and executes a function indicated by the touched and dragged first object when the first object is dropped at the drop point. Further, the second object is displayed separately and independently from the first objects.

20 Claims, 10 Drawing Sheets

MOBILE COMMUNICATION TERMINAL AND METHOD OF SELECTING MENU AND ITEM

This Non-provisional application is a Continuation of application Ser. No. 12/899,482, filed on Oct. 6, 2010 now U.S. Pat. No. 8,120,590, which is a Continuation of application Ser. No. 11/862,906, filed on Sep. 27, 2007, now U.S. Pat. No. 7,834,861, issued on Nov. 16, 2010 and for which priority is claimed under 35 U.S.C. §120, which claims priority under 35 U.S.C. §119(a) to Korean Patent Application No. 10-2006-0094159 filed in Korea on Sep. 27, 2006, the entire contents of which is hereby incorporated by reference in its entirety.

BACKGROUND OF THE INVENTION

1. Field of the Invention

The present invention relates to a mobile communication terminal and a corresponding method of selecting menus and items.

2. Discussion of Related Art

Mobile communication terminals now provide many additional services and functions besides the basic call service. For example, users can now access the Internet, send and receive text and voice messages, perform scheduling tasks, and watch movies or other broadcasts using their mobile terminal.

As the number of functions provided by the mobile terminal has increased so has the number of menu options used to select the different functions. Thus, the user uses an input unit provided with the mobile terminal to select the different menu options. However, the selection of the menu options often requires several manipulations of the input unit (e.g., to select the main menu and all of the appropriate sub-menus).

Furthermore, when the mobile terminal includes a touch screen, it is often difficult for the user to touch and select the appropriate menu options, because the menu options are displayed in a narrow or small portion on the touch screen. That is, the user often selects a sub-menu option that is next to the sub-menu option the user wanted to actually select, because the sub-menu options are provided in a narrow or small portion on the touch screen display.

SUMMARY OF THE INVENTION

Accordingly, one option of the present invention is to address the above-noted and other problems.

Another option of the present invention is to make it simple to select a menu option or other item on a mobile communication terminal.

Another object of the present invention is to make it easy for a user to correctly recognize what menu option they have selected.

To achieve these and other advantages and in accordance with the purpose of the present invention, as embodied and broadly described herein, the present invention provides in one aspect a menu selection method, which includes selecting a main menu displayed on a touch device of a terminal, displaying one or more sub-menus corresponding to the selected main menu, sensing a direction of a dragging operation on the touch device, and executing a corresponding sub-menu located in the sensed direction of the dragging operation. The present invention also provides a corresponding mobile communication terminal.

In another aspect, the present invention provides an item selection method, which includes selecting a direction point on a touch device of a terminal, sensing a direction of a dragging operation from the selected direction point on the touch device, and executing a corresponding item located in the sensed direction of the dragging operation. The present invention also provides a corresponding mobile communication terminal.

In still another aspect, the present invention provides a method of controlling a mobile terminal, and which includes allowing, via a wireless communication unit on the mobile terminal, wireless communication with at least one other terminal; displaying, on a first side of a touch screen display of the mobile terminal, a sound icon indicating whether or not a sound is output by the mobile terminal; receiving, via a controller, a touching selection signal indicating a touching of the sound icon; displaying, on the touch screen display, a first indicator corresponding to the sound icon on a second side of the touch screen display and separated from the sound icon, said first indicator indicating a direction in which a touch and drag operation should occur to turn off the sound output by the mobile terminal; receiving, via the controller, a touch and drag selection signal indicating a dragging operation along a vector from the sound icon toward an intersection with the first indicator; and turning off, via the controller, the sound output by the mobile terminal after receiving the touch and drag signal indicating the dragging operation and before the first indicator is touched. The present invention also provides a corresponding mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
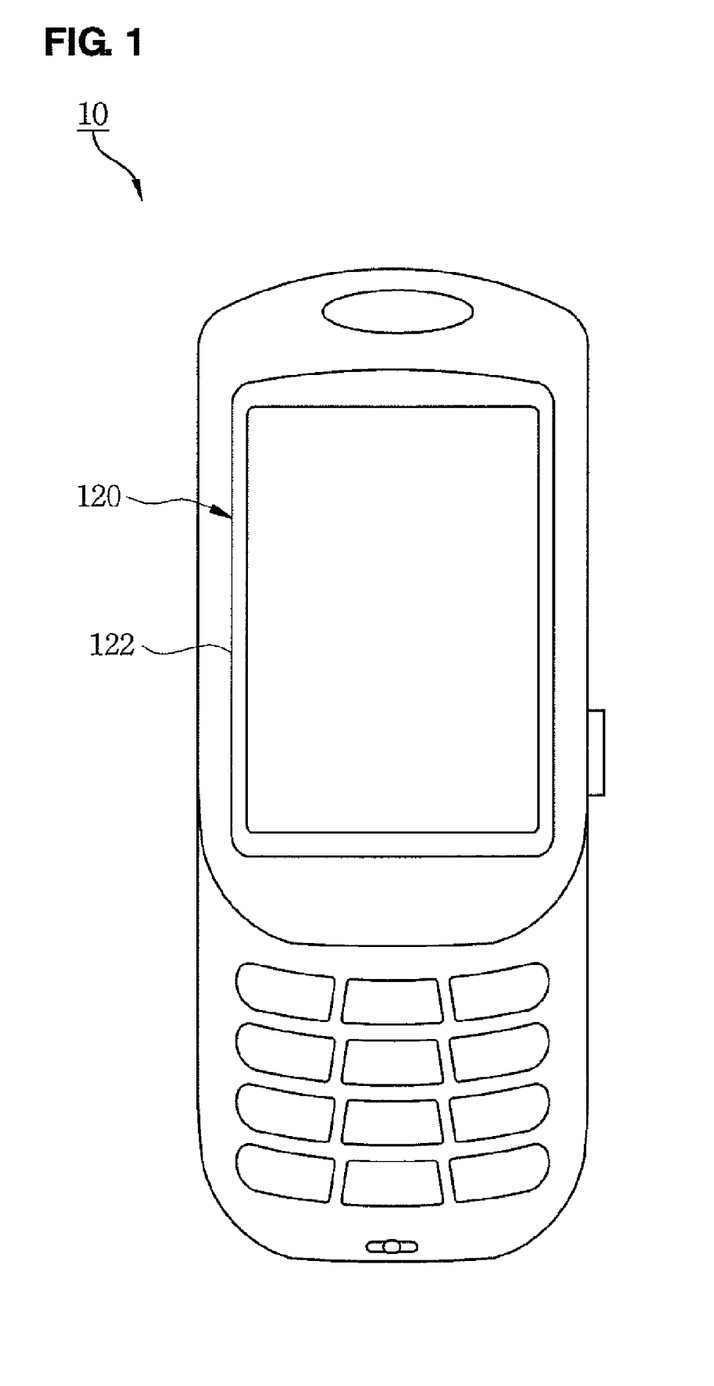
FIG. 1 is a front view of a mobile communication terminal according to an embodiment of the present invention.

FIG. 1 is a front view of a mobile communication terminal 10 according to an embodiment of the present invention. As illustrated in FIG. 1, the mobile terminal 10 includes a display unit 120 having a touch screen 122 (that is, a touch device). Further, a main menu and corresponding sub-menus are displayed on the touch screen 122 such that a user can select a desired function on the mobile terminal 10.

Figure 2:
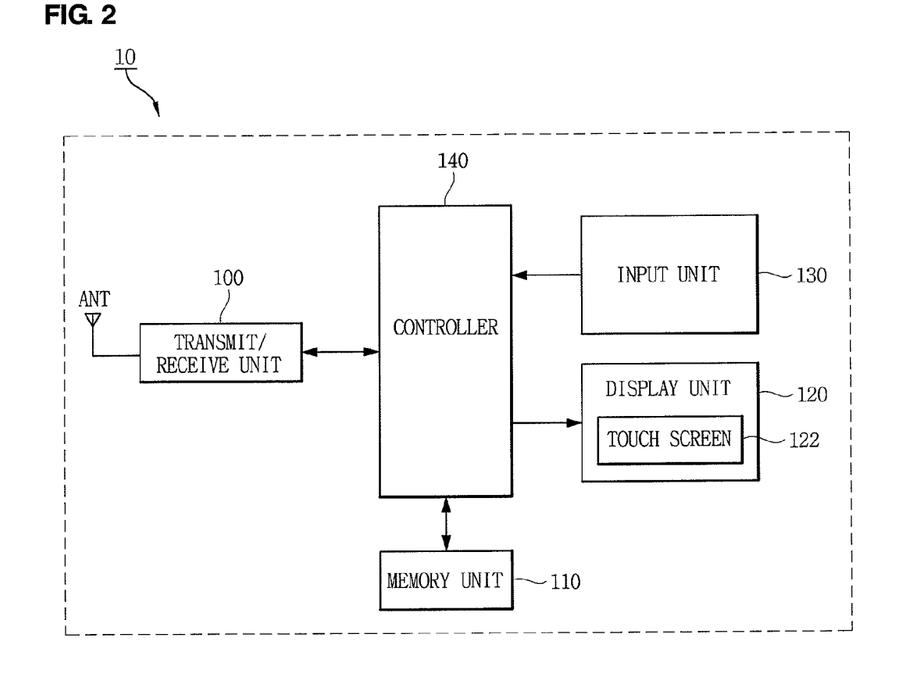
FIG. 2 is a block diagram illustrating a mobile communication terminal according to an embodiment of the present invention.

FIG. 2 is a block diagram illustrating the mobile communication terminal 10 according to an embodiment of the present invention. As illustrated in FIG. 2, the mobile communication terminal 10 includes a transmit/receive unit 100, a memory unit 110, the display unit 120, an input unit 130 and a controller 140.

The transmit/receive unit 100 receives data from a base station via an antenna ANT, and transmits data generated by the mobile communication terminal 10 to the base station via the antenna ANT. In addition, the memory unit 110 may include a flash memory, a Read Access Memory (RAM), an Electrically Erasable Programmable Read Only Memory (EEPROM) or the like, and stores a program for controlling an overall operation of the mobile communication terminal 10. The memory unit 110 also stores a plurality of main menus and one or more sub-menus corresponding to the main menus.

Further, the display unit 120 displays contents received from the transmit/receive unit 100, a variety of information signals, the contents of data stored in the memory unit 110, etc. In addition, as discussed above, the display unit 120 includes the touch screen 122 that the user can touch to select any one of a plurality of main menus and sub-menus.

Further, the touch screen 122 is a screen in which an instruction is executed or the location of a cursor is moved by recognizing a portion at which the user touches the touch screen 122 (e.g., using his or her finger, a pointer, a touch pen, etc.). For example, the touch screen 112 may be a screen in which a screen surface is filled with the flow of charge current, and have sensors installed around the screen surface. Then, the touching of the screen is detected using an electrostatic method of perceiving a place at which the user touches the touch screen 122 by sensing the degree of charges lost at the time the user touches the touch screen 122. The touch screen 122 may also be any other type of touch screen, such as a pressure-sensitive touch screen is which the screen responds to pressures applied to the screen surface, an infrared type touch screen in which a contact location is detected by sensing that infrared rays are precluded where the touch occurs, etc.

Further, the input unit 130 includes number keys, a variety of function keys, arrow keys, etc. and outputs a signal to the controller 140 corresponding to a key selected by a user. In addition, the controller 140 includes a Mobile Station Modem (MSM) and controls the general input and output operations of the mobile terminal 10. For example, if the controller 140 detects that the user has dragged his or her finger (or other pointing object) in a direction from a main menu towards a specific sub-menu displayed on the touch screen 122, the controller 140 executes the operation corresponding to the specific sub-menu. These features will now be described in more detail.

Figure 3:
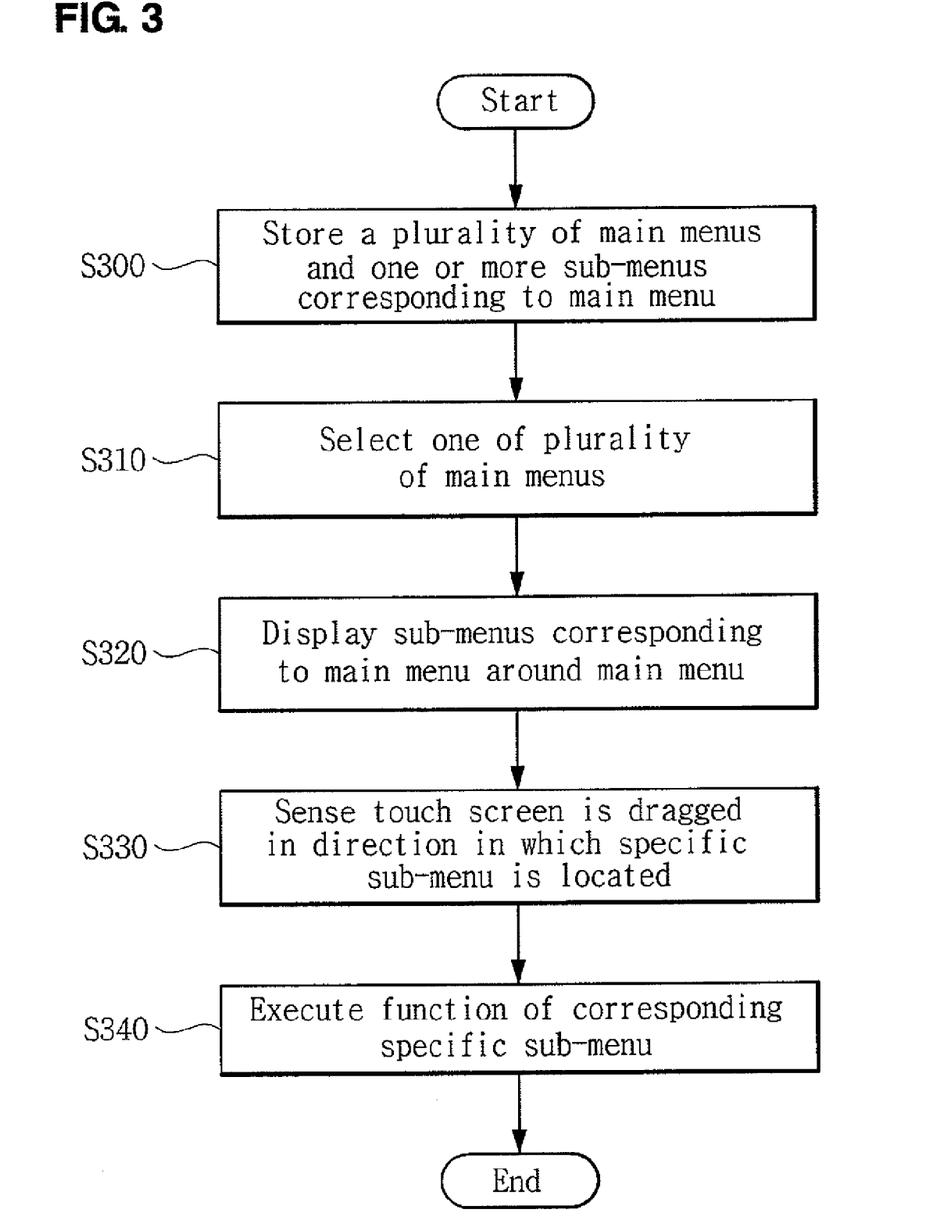
FIG. 3 is a flowchart illustrating a method of selecting a menu according to an embodiment of the present invention.

In more detail, FIG. 3 is a flowchart illustrating a method of selecting a menu according to an embodiment of the present invention. FIG. 2 will also be referred to in this description.

Figure 4A:
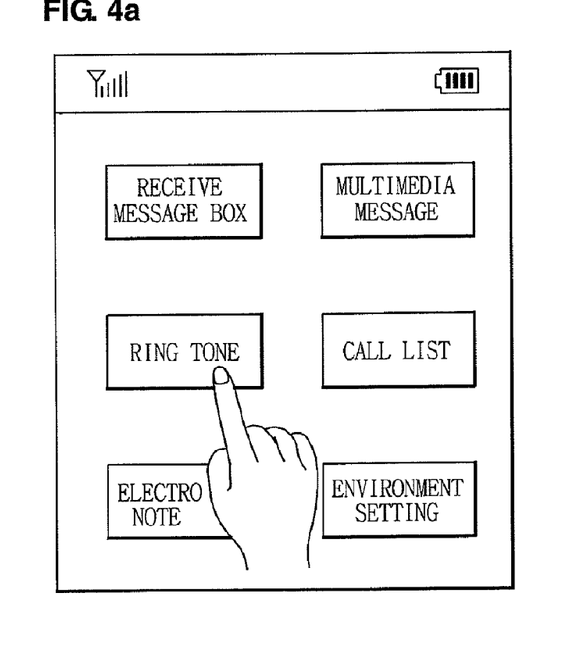
FIGS. 4(a)-4(d) are overviews illustrating a method of selecting sub-menus according to an embodiment of the present invention.

As shown in FIG. 3, the controller 140 stores a plurality of main menus, and one or more sub-menus corresponding to the main menus in the memory unit 110 (step S300). Further, the main menus and the sub-menus have a hierarchical structure formed by collecting correlated functions. That is, the main menu refers to a menu covering the correlated function of one or more sub-menus. For example, FIG. 4(a) illustrates main menus including a receive message box, a multimedia message, ring tones, a call list, an electronic note, and an environment setting. Other main menus may also be displayed, and FIG. 4(a) is only a partial list of all main menus that may be included with a mobile terminal.

Figure 4B:
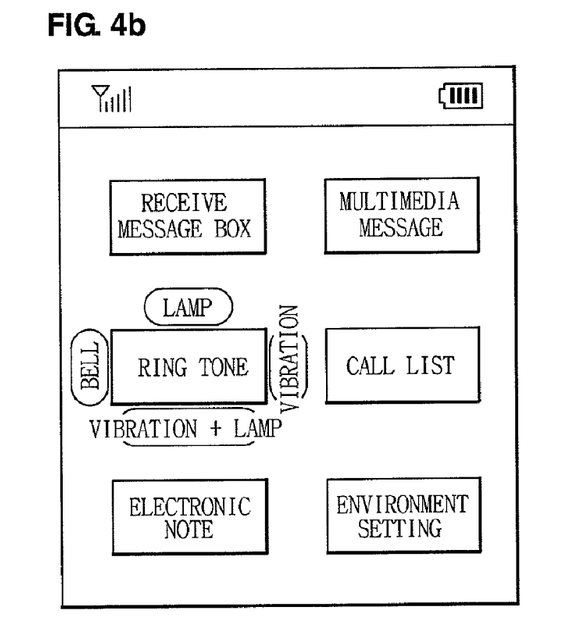

Next, in FIG. 3, the user can select any one of the displayed main menus by touching a corresponding main menu (step S310). For example, FIG. 4(b) illustrates a state in which the user touches the main menu "ring tone" in FIG. 4(a). As shown in FIG. 4(b), when the user selects the main menu "ring tone", the controller 140 displays a plurality of corresponding sub-menus around the main menu (step S320 in FIG. 3).

That is, the controller 140 displays the sub-menus "lamp", "vibration", "bell" and "vibration+lamp" corresponding to the main menu "ring tone" around the main menu "ring tone" as illustrated in FIG. 4(b). In this embodiment, the main menu "ring tone" is located at the center, and the sub-menus "lamp", "vibration", "bell", and "vibration+lamp" are located so as to surround the main menu "ring tone".

Figure 4C:
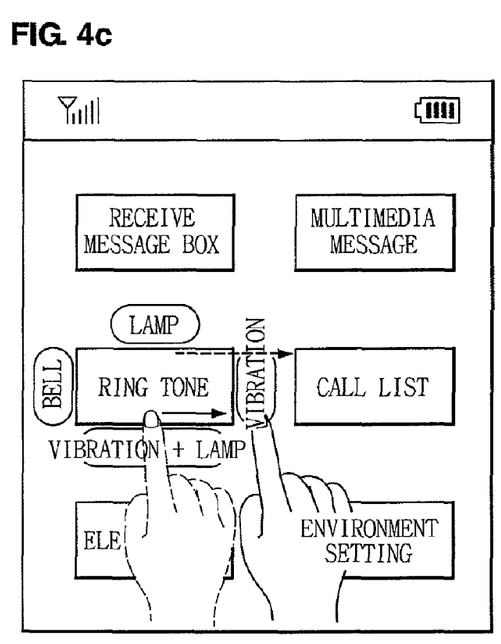
Figure 4D:
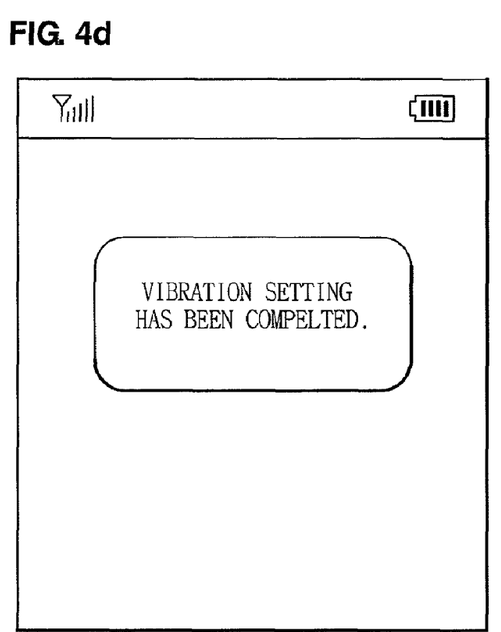

Then, as shown in FIG. 4(c), the user drags his or her finger from the main menu "ring tone" in a right direction to the sub-menu "vibration". Thus, the controller 140 senses the user has dragged his or her finger (or other pointing device) in this direction (step S330 in FIG. 3), and executes the operation corresponding to the sub-menu "vibration" (step S340). That is, the controller 140 sets the ring tone for the mobile terminal 10 to be a vibration ring tone (where the terminal 10 simply vibrates to inform the user about an incoming call, text or voice message, etc). The controller 140 also displays a completion message "Vibration setting has been completed" to the user as shown in FIG. 4(d). The controller 140 may also just vibrate the terminal 10 to inform the user that the vibration setting has been completed, rather than displaying the completion message.

Figure 5:
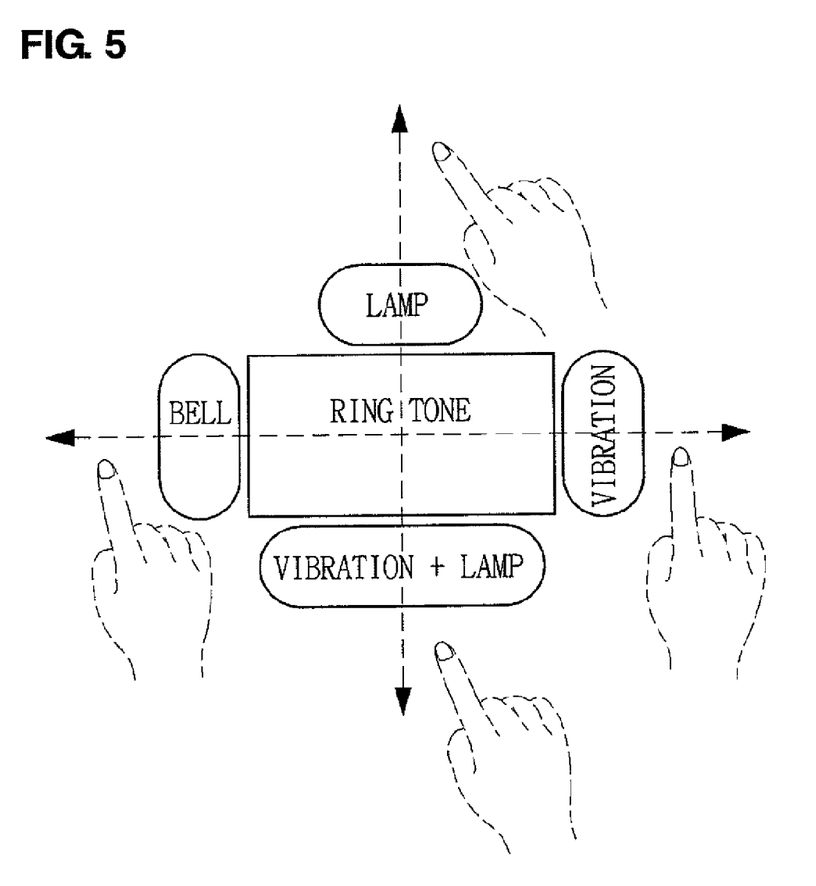
FIG. 5 is an overview illustrating a method of selecting a specific sub-menu of the sub-menus shown in FIGS. 4(a)-(d)

FIG. 5 illustrates the main menu "ring tone" and corresponding sub-menus, and the directions in which the user may drag his or her finger to select and execute a corresponding sub-menu. In other words, to select the sub-menu "vibration", the user first touches the main menu "ring tone" and then drags their finger in the right direction to the "vibration" sub-menu. Similarly, to select the sub-menu "lamp", the user first touches the main menu "ring tone" and then drags their finger in an upward direction to the "lamp" sub-menu. Further, to select the sub-menu "bell", the user first touches the main menu "ring tone" and then drags their finger in the left direction to the "bell" sub-menu. Also, to select the menu "vibration+lamp", the user first touches main menu "ring tone" and then drags their finger in a downward direction to the "bell" sub-menu.

In addition, FIG. 5 illustrates the user dragging his or her finger all the way through the corresponding sub-menu. However, it is also possible for the controller 140 to activate a corresponding sub-menu function when the user simply drags his or her finger in a direction toward the corresponding sub-menu without actually contacting the sub-menu or when partially passing through the corresponding sub-menu.

Figure 6A:
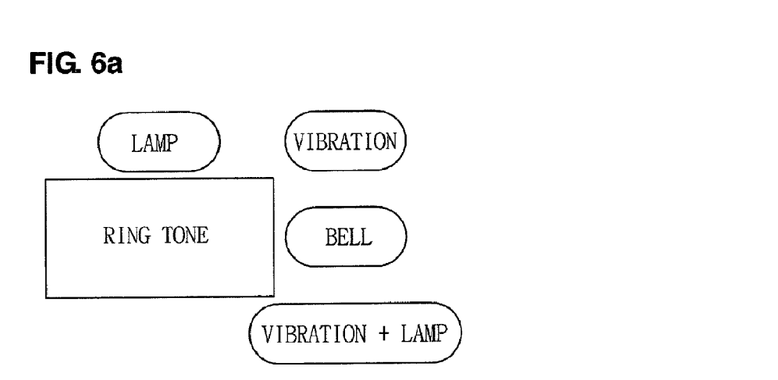
FIGS. 6(a)-6(e) are overviews illustrating displayed main menus with their corresponding sub-menus according to an embodiment of the present invention.

Next, FIGS. 6(a)-6(e) illustrate the main menu "ring tone" and corresponding sub-menus being displayed in a variety of different arrangements. In more detail, and as illustrated in FIG. 6(a), the sub-menus can be displayed so as to surround only a part of a main menu. In other words, the sub-menus "lamp", "vibration", "bell", and "vibration+lamp" are displayed only on the upper and right sides of the main menu "ring tone".

Figure 6B:
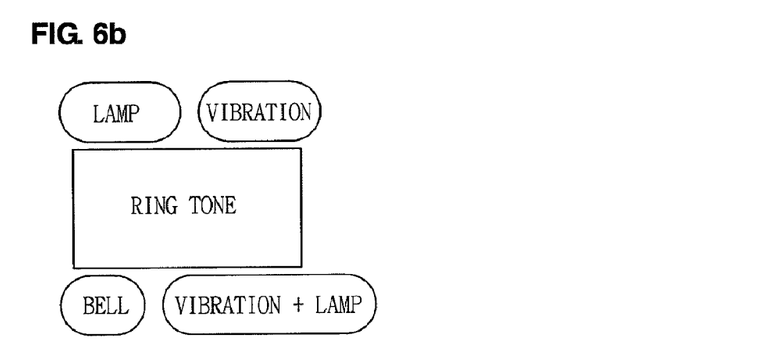
Figure 6C:
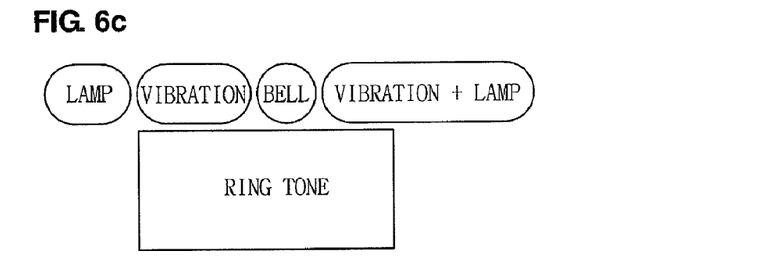

Alternatively, as illustrated in FIG. 6(b), the sub-menus "lamp", "vibration", "bell", and "vibration+lamp" are displayed only on the upper and lower sides of the main menu "ring tone". Further, the sub-menus may also be displayed next to the main menu without surrounding the main menu. In other words, as illustrated in FIG. 6(c), the sub-menus "lamp", "vibration", "bell", and "vibration+lamp" are displayed only on the upper side of the main menu "ring tone".

Figure 6D:
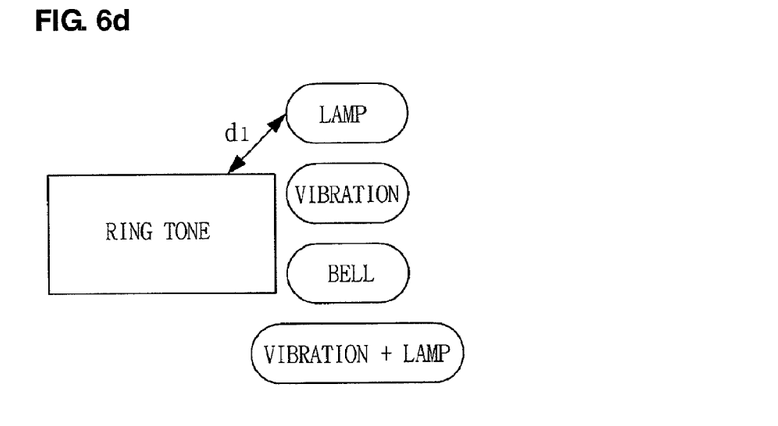
Figure 6E:
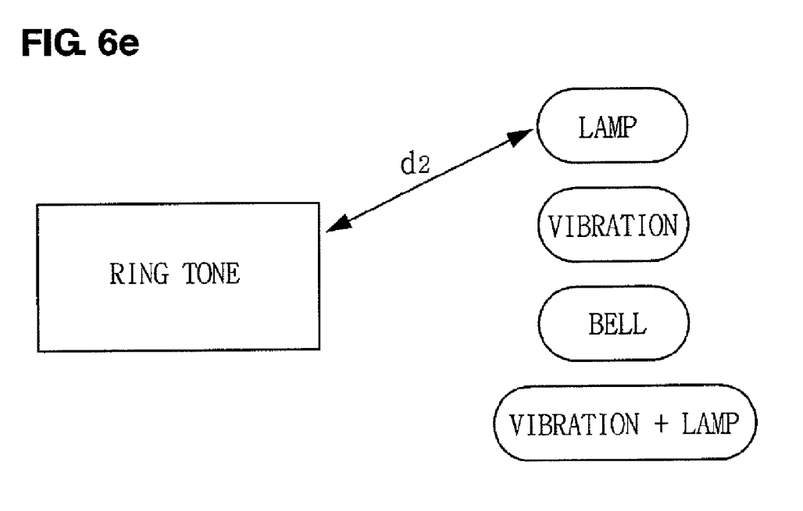

Alternatively, as illustrated in FIG. 6(d), the sub-menus "lamp", "vibration", "bell", and "vibration+lamp" are displayed only on the right side of the main menu "ring tone". Further, as shown in FIG. 6(d), the sub-menus "lamp", "vibration", "bell", and "vibration+lamp" are a distance $d_1$ from the main menu "ring tone". Alternatively, as shown in FIG. 6(e), the sub-menus "lamp", "vibration", "bell", and "vibration+lamp" are displayed only on the right side of the main menu "ring tone" at a distance $d_2$ from the main menu "ring tone" (rather than at a distance $d_1$ as in FIG. 6(d)). In addition, even thought the direction $d_2$ is longer than the direction $d_1$, the user can select the sub-menus that are a distance $d_2$ away from the main menu, by simply dragging their finger in the direction of the corresponding sub-menu. Further, the sub-menus may be displayed only on the right side of the main menu (as shown in FIG. 6(d)) or may be displayed only on the left side of the main menu.

Figure 7A:
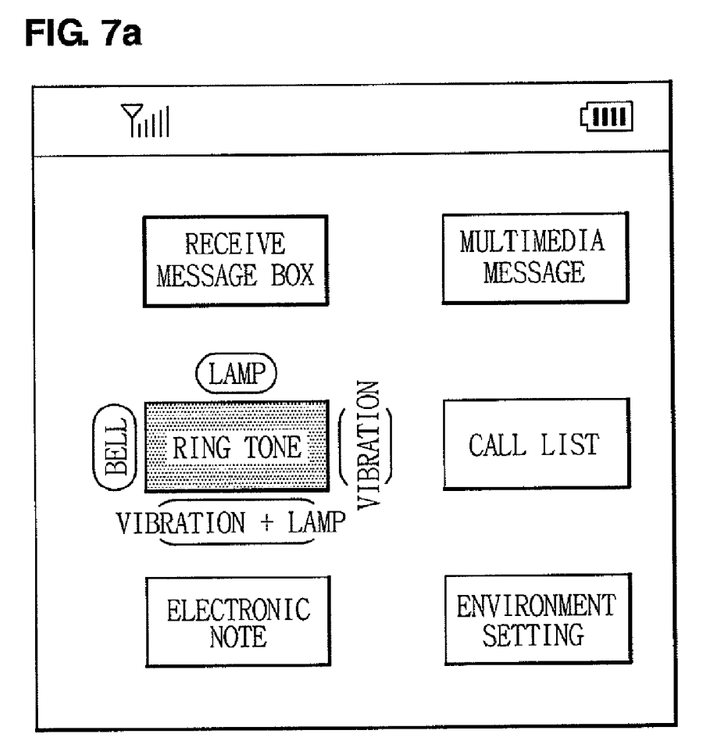
FIGS. 7(a) and 7(b) are overviews illustrating a method of selecting a specific main menu and then selecting another main menu according to an embodiment of the present invention.

Next, FIGS. 7(a) and 7(b) are overviews illustrating a method of selecting a specific main menu and then selecting another main menu according to an embodiment of the present invention. In more detail, and as shown in FIG. 7(a), when the user selects a main menu setting option on the terminal, a plurality of main menus are displayed. Then, when the user selects the "ring tone" main menu, the controller 140 displays the corresponding sub-menus related to the selected main menu on the touch screen 122 as shown in FIG. 7(a).

Figure 7B:
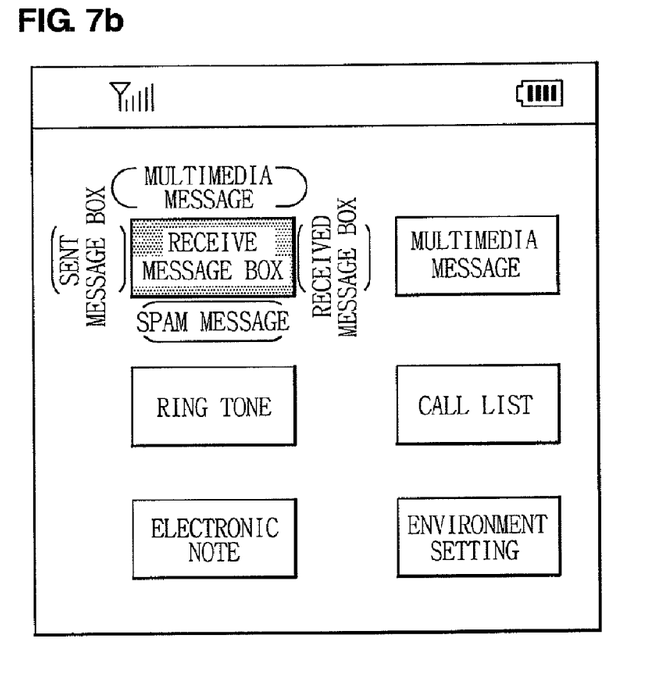

Further, as shown in FIG. 7(b), when the user selects the main menu "receive message box", the controller 140 confirms the selection (e.g., by highlighting the selected main menu) and displays the corresponding sub-menus. In other words, the controller 140 activates the main menu "receive message box", which has been selected by the user, and displays the sub-menus "received message box", "sent message box", "spam message" and "multimedia message" corresponding to the main menu "receive message box" on the touch screen 122. Further, at the same time, the controller 140 deactivates the other non-selected main menus and sub-menus.

Figure 8A:
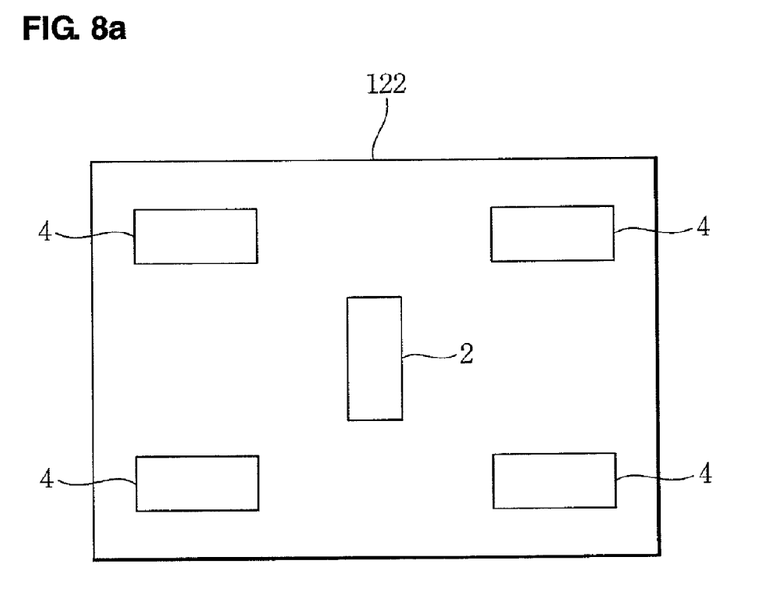
FIGS. 8(a) and 8(b) are overviews illustrating a method of selecting a specific direction point and then performing a dragging operation towards a particular item to thereby select the particular item according to an embodiment of the present invention.
Figure 8B:
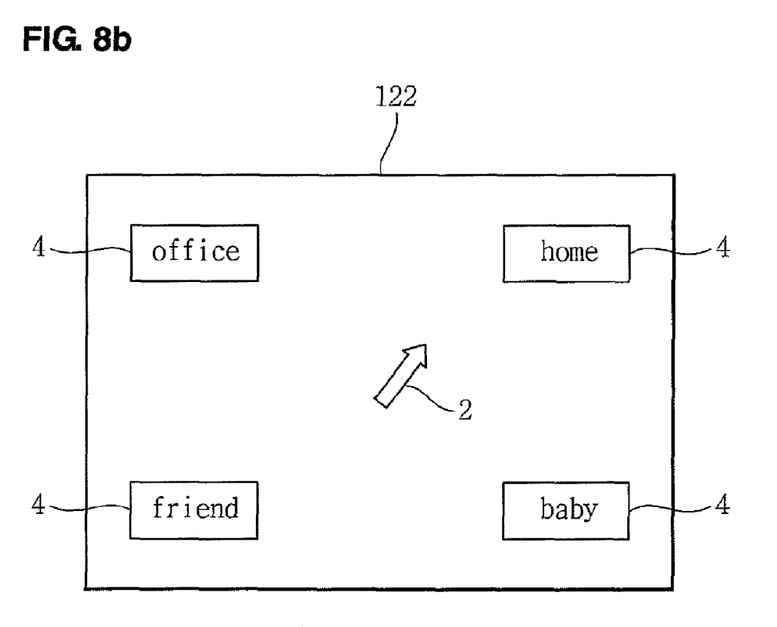

Next, FIGS. 8(a) and 8(b) are overviews illustrating a method of selecting a specific direction point on the touch screen 122 and then performing a dragging operation towards a particular item to thereby select the particular item according to an embodiment of the present invention. As shown in FIG. 8(a), the controller 140 displays a direction point 2 and a plurality of selectable items 4 on the touch screen 122 of the terminal. In this example, the plurality of items 4 corresponding to contacts that the user can call (e.g., home contact, babysitter contact, office contact, friend contact, etc.). However, the selectable items can be any one of a menu option, characters, icons, a Uniform Resource Locator (URL), a music file, a picture file, etc.

Then, when the user selects (touches) the direction point 2 and drags their finger in a particular direction toward an item 4, the controller 140 senses the direction of the dragging operation from the selected direction point 2 toward the item 4. The controller 140 then executes a corresponding item located in the sensed direction of the dragging operation. For example, as shown in FIG. 8(b), the controller 140 senses the user touches the direction point 2 and performs a dragging operation toward the home contact 4 in the upper right hand corner of the touch screen 122. In this instance, the controller 140 would then perform a dialing operation to dial the home phone number included in the corresponding selected item 4. As in the other embodiments, the controller 140 can execute a function corresponding to the particular item when the user just performs a dragging operation towards the item 4, or when the user drags his or her finger all the way across or partially across the particular item 4.

Note also that in FIG. 8(a), the touch direction point 2 is displayed as a bar, and when the user touches and performs a dragging operation, the controller 140 changes the displayed bar into an arrow pointing in the direction in which the user performs the dragging operation. Thus, the user can easily confirm the direction of the dragging operation and the item to be selected.

Further, FIGS. 8(a) and 8(b) illustrate four selected items, but any number of items may be displayed. The items 4 may also be displayed in alternative arrangements as discussed above with respect to the menu options. In addition, when the item 4 is a music or picture file, the controller 140 plays the music file or displays the picture file in a full screen mode, for example. When the item 4 is a URL, the controller 140 connects to the web page associated with the URL.

Further, as described above, the user can select a sub-menu by dragging their finger in the direction of the sub-menu without actually touching the sub-menu, or may pass through all or only part of the sub-menu to select it. These different ways of selecting a sub-menu can be advantageously set by a user using the appropriate menu options provided on the mobile terminal. For example, the user may select a "selecting sub-menus" main menu option on the terminal and then select the appropriate method he or she desires to be used for selecting sub-menus. The user can also select an option such that the main menu is dragged in a direction of the sub-menu to select the corresponding sub-menu.

Further, the above-described embodiments refer to a mobile communication terminal. However, the present invention is also applicable to all types of terminals equipped with a touch device. In addition, it is also possible to select an item or menu option on the touch screen by selecting a particular point on the touch screen and then dragging a pointer in a direction of the item.

As described above, the present invention has several advantages. First, the user can easily select a corresponding sub-menu or item that is displayed on the touch screen of the terminal. The selectable options provided on the terminal may also be freely arranged in any desired manner. The user can also easily determine which selectable option he or she has selected.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a wireless communication unit configured to wirelessly communicate with at least one other terminal;
a touch screen display configured to display a plurality of independent menu objects; and
a controller configured to:
receive a selection signal corresponding to a touching of one of the menu objects,
control the touch screen display to display an independent drop-point object corresponding to a drop point where the touched menu object can be dropped,
receive a dragging signal corresponding to the touched menu object being touched, dragged and dropped toward the drop-point object,
distinguish the menu object from other non-selected menu objects, and
execute a function indicated by the touched and dragged menu object when the menu object is dropped at the drop point,
wherein the drop-point object is displayed separately and independently from the menu objects.

2. The mobile terminal of claim 1, wherein the touched menu object is displayed below the drop-point object.

3. The mobile terminal of claim 2, wherein the menu objects include at least four menu objects.

4. The mobile terminal of claim 1, wherein the drop-point object has a rounded shape.

5. The mobile terminal of claim 1, wherein the controller is further configured to control the touch screen display to display the menu object to be separated from the drop-point object and not overlapping the drop-point object before the menu object is touched.

6. The mobile terminal of claim 1, wherein the dragging and dropping touch action is along a direction from the menu object to the drop-point object.

7. The mobile terminal of claim 1, wherein the function executed includes at least one of a calling function for calling contacts and a viewing message function for viewing messages.

8. The mobile terminal of claim 1, wherein the menu objects include text indicating a corresponding function of the menu objects.

9. The mobile terminal of claim 1, wherein the menu objects are displayed as icons.

10. The mobile terminal of claim 1, wherein the controller is further configured to execute the function indicated by the touched and dragged menu object when at least one of the menu object is touched and dragged to partially overlap the drop-point object, and the touched and dragged menu object is touched and dragged to fully overlap the drop-point object.

11. A method of controlling a mobile terminal, the method comprising:
allowing, via a wireless communication unit of the mobile terminal, wireless communication with at least one other terminal;
displaying, via a touch screen display of the mobile terminal, a plurality of independent menu objects;
receiving, via a controller of the mobile terminal, a selection signal corresponding to a touching of one of the menu objects;
controlling, via the controller, the touch screen display to display an independent drop-point object corresponding to a drop point where the touched menu object can be dropped;
receiving, via the controller, a dragging signal corresponding to the touched menu object being touched, dragged and dropped toward the drop-point object;
distinguishing, via the controller, the menu object from other non-selected menu objects; and
executing, via the controller, a function indicated by the touched and dragged menu object when the menu object is dropped at the drop point,
wherein the drop-point object is displayed separately and independently from the menu objects.

12. The method of claim 11, wherein the touched menu object is displayed below the drop-point object.

13. The method of claim 12, wherein the menu objects include at least four menu objects.

14. The method of claim 11, wherein the drop-point object has a rounded shape.

15. The method of claim 11, further comprising:
controlling, via the controller, the touch screen display to display the menu object to be separated from the drop-point object and not overlapping the drop-point object before the menu object is touched.

16. The method of claim 11, wherein the dragging and dropping touch action is along a direction from the menu object to the drop-point object.

17. The method of claim 11, wherein the function executed includes at least one of a calling function for calling contacts and a viewing message function for viewing messages.

18. The method of claim 11, wherein the menu objects include text indicating a corresponding function of the menu objects.

19. The method of claim 11, wherein the menu objects are displayed as icons.

20. The method of claim 11, wherein the executing step executes the function indicated by the touched and dragged menu object when at least one of the menu object is touched and dragged to partially overlap the drop-point object, and the touched and dragged menu object is touched and dragged to fully overlap the drop-point object.

* * * * *